(12) United States Patent
Velozo et al.

(10) Patent No.: US 9,898,647 B2
(45) Date of Patent: *Feb. 20, 2018

(54) SYSTEMS AND METHODS FOR DETECTING, IDENTIFYING AND TRACKING OBJECTS AND EVENTS OVER TIME

(71) Applicant: Promethean Limited, Blackburn, Lancashire (GB)

(72) Inventors: Steven C. Velozo, Seattle, WA (US); Alex H. Decker, Seattle, WA (US); Jason C. Hillier, Seattle, WA (US)

(73) Assignee: Promethean Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/383,612

(22) Filed: Dec. 19, 2016

(65) Prior Publication Data

US 2017/0103256 A1 Apr. 13, 2017

Related U.S. Application Data

(63) Continuation of application No. 14/297,494, filed on Jun. 5, 2014, now Pat. No. 9,524,418.

(51) Int. Cl.
*G06K 9/00* (2006.01)
*G06K 9/78* (2006.01)
*G06T 7/70* (2017.01)

(52) U.S. Cl.
CPC ..... *G06K 9/00228* (2013.01); *G06K 9/00295* (2013.01); *G06K 9/00771* (2013.01);
(Continued)

(58) Field of Classification Search
CPC .. G06K 9/00228; G06K 9/00442; G06K 9/78; G06K 9/00295; G06K 2009/00328;
(Continued)

(56) References Cited

U.S. PATENT DOCUMENTS 7,035,430 B2 4/2006 Ito et al.
7,218,774 B2 5/2007 Liu
(Continued)

FOREIGN PATENT DOCUMENTS

EP 2720459 4/2014

OTHER PUBLICATIONS

International Search Report, dated Nov. 10, 2015, from corresponding International Application No. PCT/US2015/034347.
(Continued)

*Primary Examiner* — Yon Couso
(74) *Attorney, Agent, or Firm* — Brient Globerman, LLC; Kyle M. Globerman

(57) ABSTRACT

A system for detecting, identifying and tracking objects of interest over time is configured to derive object identification data from images captured from one or more image capture devices. In some embodiments of the system, the one or more image capture devices perform a first object detection and identification analysis on images captured by the one or more image capture devices. The system may then transmit the captured images to a server that performs a second object detection and identification analysis on the captures images. In various embodiments, the second analysis is more detailed than the first analysis. The system may also be configured to compile data from the one or more image capture devices and server into a timeline of object of interest detection and identification data over time.

20 Claims, 9 Drawing Sheets

(52) U.S. Cl.
CPC .............. *G06K 9/78* (2013.01); *G06T 7/70* (2017.01); *G06K 2009/00328* (2013.01)

(58) Field of Classification Search
CPC ............ G06K 9/00288; G06K 9/00771; G06T 2207/10141; G06T 7/70; G06T 2207/30176; G06T 2207/20016; G06T 7/004; G06T 2207/30201; G08B 13/196
See application file for complete search history.

(56) References Cited

U.S. PATENT DOCUMENTS

| | | | |
|---|---|---|---|
| 7,356,447 | B2 | 4/2008 | Marschner et al. |
| 7,634,662 | B2 | 12/2009 | Monroe |
| 8,295,546 | B2 | 10/2012 | Craig et al. |
| 8,611,655 | B2 | 12/2013 | Bryant et al. |
| 9,007,481 | B2 | 4/2015 | Hasegawa et al. |
| 9,195,883 | B2 | 11/2015 | Brewer et al. |
| 2005/0226464 | A1 | 10/2005 | Sun et al. |
| 2008/0247601 | A1 | 10/2008 | Ito et al. |
| 2014/0064558 | A1 | 3/2014 | Huang et al. |
| 2014/0146172 | A1 | 5/2014 | Kajitani et al. |

OTHER PUBLICATIONS

International Search Report, dated Oct. 12, 2015, from corresponding International Application No. PCT/US2015/034354.
Written Opinion of the International Searching Authority, dated Nov. 10, 2015, from corresponding International Application No. PCT/US2015/034347.
Written Opinion of the International Searching Authority, dated Oct. 12, 2015, from corresponding International Application No. PCT/US2015/034354.
International Preliminary Report on Patentability, dated Dec. 15, 2016, from corresponding International Application No. PCT/US2015/034347.
Invitation to Pay Additional Search Fees and Partial International Search Report, dated Sep. 2, 2015, from corresponding International Application No. PCT/US2015/034347.
Notice of Allowance, dated Oct. 6, 2015, from corresponding U.S. Appl. No. 14/297,513.
Office Action, dated Jun. 17, 2015, from corresponding U.S. Appl. No. 14/297,513.
International Preliminary Report on Patentability, dated Dec. 15, 2016, from corresponding International Application No. PCT/US2015/034354.

SYSTEMS AND METHODS FOR DETECTING, IDENTIFYING AND TRACKING OBJECTS AND EVENTS OVER TIME

CROSS-REFERENCE TO RELATED APPLICATIONS

This application is a continuation of U.S. patent application Ser. No. 14/297,494, filed on Jun. 5, 2014 and entitled "SYSTEMS AND METHODS FOR DETECTING, IDENTIFYING AND TRACKING OBJECTS AND EVENTS OVER TIME." This application is related to, but does not claim priority from, granted U.S. Pat. No. 9,269,159, issued Feb. 23, 2016, and entitled "SYSTEMS AND METHODS FOR TRACKING OBJECT ASSOCIATION OVER TIME," which is hereby incorporated herein by reference in its entirety.

BACKGROUND

Teachers and other education professionals desire improved ways to engage with and track students and their progress. Similarly, national security concerns have led to a need for improved object detection, identifying, and event detection techniques for security purposes. Accordingly, there is a need for improved systems and methods that address these needs.

SUMMARY

A system for detecting and tracking one or more objects over time, in various embodiments, comprises: (1) an image capture device comprising a camera, at least one processor operatively coupled to the camera and memory operatively coupled to the at least one processor; and (2) a server having at least one processor and memory. In particular embodiments, the image capture device is confirmed to: (1) capture a first image at a particular time; (2) at least partially in response to capturing the first image, perform low resolution object detection and identification analysis of the first image to detect and identify at least one object of interest; (3) in response to detecting and identifying the at least one object of interest, storing information associated with the first image and the particular time in the image capture device memory; and (4) transmit at least a portion of the first image to the server. In some embodiments the server is configured to: (1) receive the at least one portion of the first image; (2) perform high resolution object detection and identification analysis of the first image to detect and identify at least one object of interest; and (3) in response to detecting and identifying the at least one object of interest, storing information associated with the first image and the particular time in the server memory.

A system for detecting and tracking an event in a classroom, in various embodiments comprises an image capture device comprising a camera, at least one processor operatively coupled to the camera and memory operatively coupled to the at least one processor. In particular embodiments, the at least one processor is configured to: (1) capture a first plurality of images at a first location between a first start time and a first stop time; (2) after capturing each one of the plurality of images, analyze each one of the first plurality of images using a first filter to detect the presence of one or more faces; (3) at least partially in response to detecting the presence of the one or more faces, analyze each one of the first plurality of images using a second filter to recognize each one of the one or more detected faces; and (4) store information about each one of the one or more recognized faces and a particular time when the respective one of the first plurality of images was captured in the memory.

BRIEF DESCRIPTION OF THE DRAWINGS

Various embodiments of a system and method for object detection and tracking over time are described below. In the course of this description, reference will be made to the accompanying drawings, which are not necessarily drawn to scale, and wherein.

DETAILED DESCRIPTION

Figure 1A:
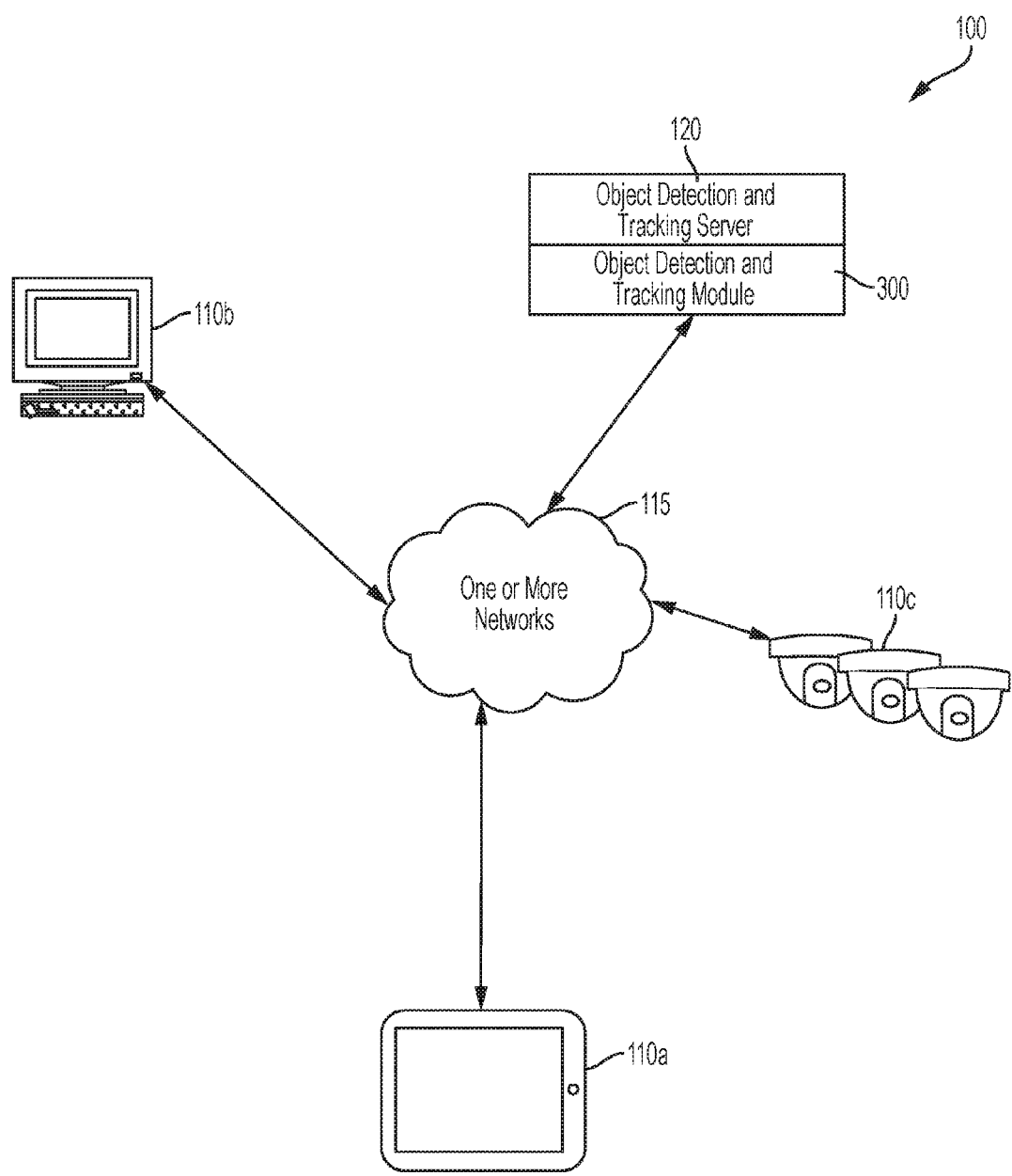
FIG. 1A is a block diagram of an object detection and tracking system in accordance with an embodiment of the present system.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

In particular embodiments, a system for detecting, identifying and tracking objects over time is configured to: (1) identify one or more objects of interest in an image; (2) perform object detection and identification analysis on the one or more objects of interest; (3) store information associated with the one or more detected objects of interest and the time at which the image was captured; and (4) create a timeline of the information associated with the one or more objects over time.

As an example in a classroom setting, the system may be configured to take one or more images of the classroom at one or more particular points in time. For each image, the system may be configured to recognize the existence of one or more faces (e.g., students in the classroom) in the image and identify the one or more faces. In various embodiments, if the system recognizes a face in the image but cannot identify the face, the system may be configured to flag the face for immediate user input or for input by the user at a later time. In this way, the system may automatically take attendance for the user. In various embodiments, the system may be configured to flag students that are missing from the classroom or it may be configured to identify a new face that has not previously been associated with the classroom (e.g., either when a new student has been assigned to the classroom or when a student accidently goes to the wrong classroom).

In various embodiments, the system is configured to perform the above described functions, for example, locally on a remote computing device such as a smart camera or other suitable remote computing device. The system, in particular embodiments, is then configured to transmit at least a portion of each image to a server, where the system is configured to perform similar object detection and identification analysis at a more detailed level than the level at which the remote computing device performs the analysis. In particular embodiments, the system is configured to create a timeline (e.g., data stream) of object detection and identification information over time. In various embodiments, the system is configured to compile object detection and identification information determined from a plurality of remote computing devices to create a single timeline.

Exemplary Technical Platforms

As will be appreciated by one skilled in the relevant field, the present systems and methods may be, for example, embodied as a computer system, a method, or a computer program product. Accordingly, various embodiments may be entirely hardware or a combination of hardware and software. Furthermore, particular embodiments may take the form of a computer program product stored on a computer-readable storage medium having computer-readable instructions (e.g., software) embodied in the storage medium. Various embodiments may also take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, a special purpose computer, or other programmable data processing apparatus to produce a machine. As such, the instructions executed on the general purpose computer, special purpose computer, or other programmable data processing apparatus can direct a computer or other programmable data processing apparatus to function in a particular manner such that the instructions stored in the computer-readable memory produce an article that is configured for implementing the functions specified in the flowchart block or blocks.

The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including but not limited to: a local area network (LAN); a wide area network (WAN); a cellular network; or the connection may be made to an external computer (for example, through the Internet using an Internet Service Provider).

These computer program instructions may also be stored in a computer-readable memory that can direct a computer or other programmable data processing apparatus to function in a particular manner such that the instructions stored in the computer-readable memory produce an article that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Example System Architecture

FIG. 1A is a block diagram of a system for detecting, identifying and tracking objects over time 100 according to a particular embodiment. As may be understood from this figure, the system for detecting, identifying and tracking objects over time 100 includes One or More Networks 115, One or More Remote Computing Devices 110a, 110b, 110c (e.g., such as a smart phone, a tablet computer, a wearable computing device, a laptop computer, a desktop computer, a smart camera, etc.), and an Object Detection and Tracking Server 120. In particular embodiments, the One or More Networks 115 facilitate communication between the One or More Remote Computing Devices 110a, 110b, 110c and the Object Detection and Tracking Server 120.

The One or More Networks 115 may include any of a variety of types of wired or wireless computer networks such as the Internet, a private intranet, a mesh network, a public switch telephone network (PSTN), or any other type of network (e.g., a network that uses Bluetooth or near field communications to facilitate communication between computing devices). The communication link between the One or More Remote Computing Devices 110a, 110b, 110c and the Object Detection and Tracking Server 120 may be, for example, implemented via a Local Area Network (LAN) or via the Internet.

Figure 1B:
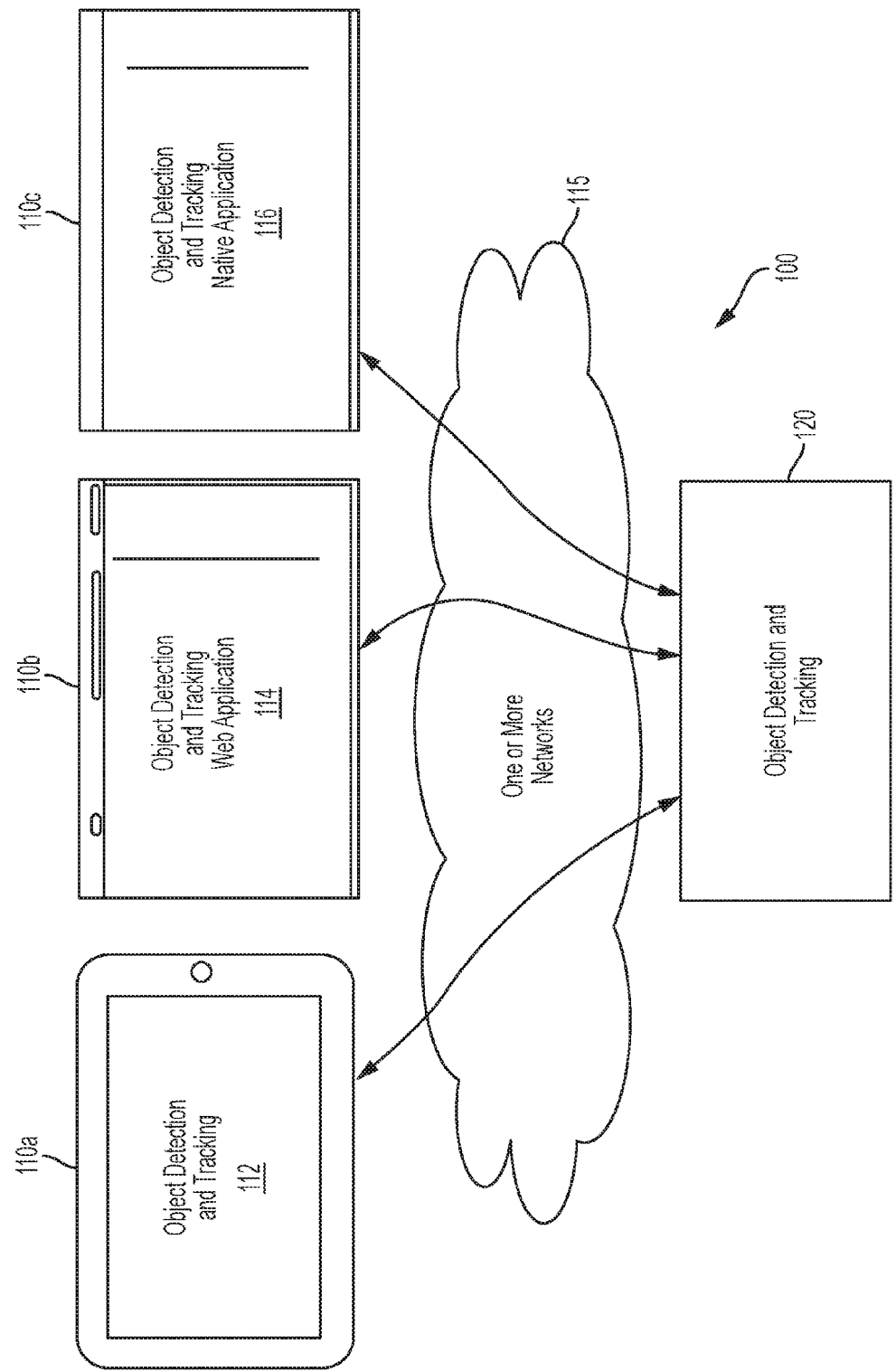
FIG. 1B is a block diagram of the object detection and tracking system in accordance with another embodiment of the present system.

As may be understood from FIG. 1B, in various embodiments, the One or More Remote Computing Devices 110, 110b, 110c may be configured to run one or more Object Detection and Tracking Applications 112, 114, 116 in order to implement the system for detecting, identifying and tracking objects over time 100, and to provide access to the Object Detection and Tracking System 100 to one or more users. In a particular embodiment, a mobile device such as, for example, a tablet computer or smartphone 110a, may be configured to run an Object Detection and Tracking Mobile Application 112. In various embodiments, a desktop or laptop computer may be configured to run an Object Detection and Tracking Web Application 114, for example, via a suitable web browser or the desktop or laptop computer may be configured to run an Object Detection and Tracking Native Application 116. In other embodiments, a remote computing device such as an imaging device or other suitable computing device may be configured to run an Object Detection and Tracking Native Application 116. Thus, it should be understood that the system for detecting, identifying and tracking objects over time 100 may comprise one or more mobile computing devices having a built in camera coupled to the Object Detection and Tracking Server 120, one or more desktop or laptop computers coupled to the Object Detection and Tracking Server 120, one or more smart imaging devices coupled to the Object Detection and Tracking Server 120, and/or one or more imaging devices (e.g., cameras that do not perform image processing) coupled to the Object Detection and Tracking Server 120.

Figure 2A:
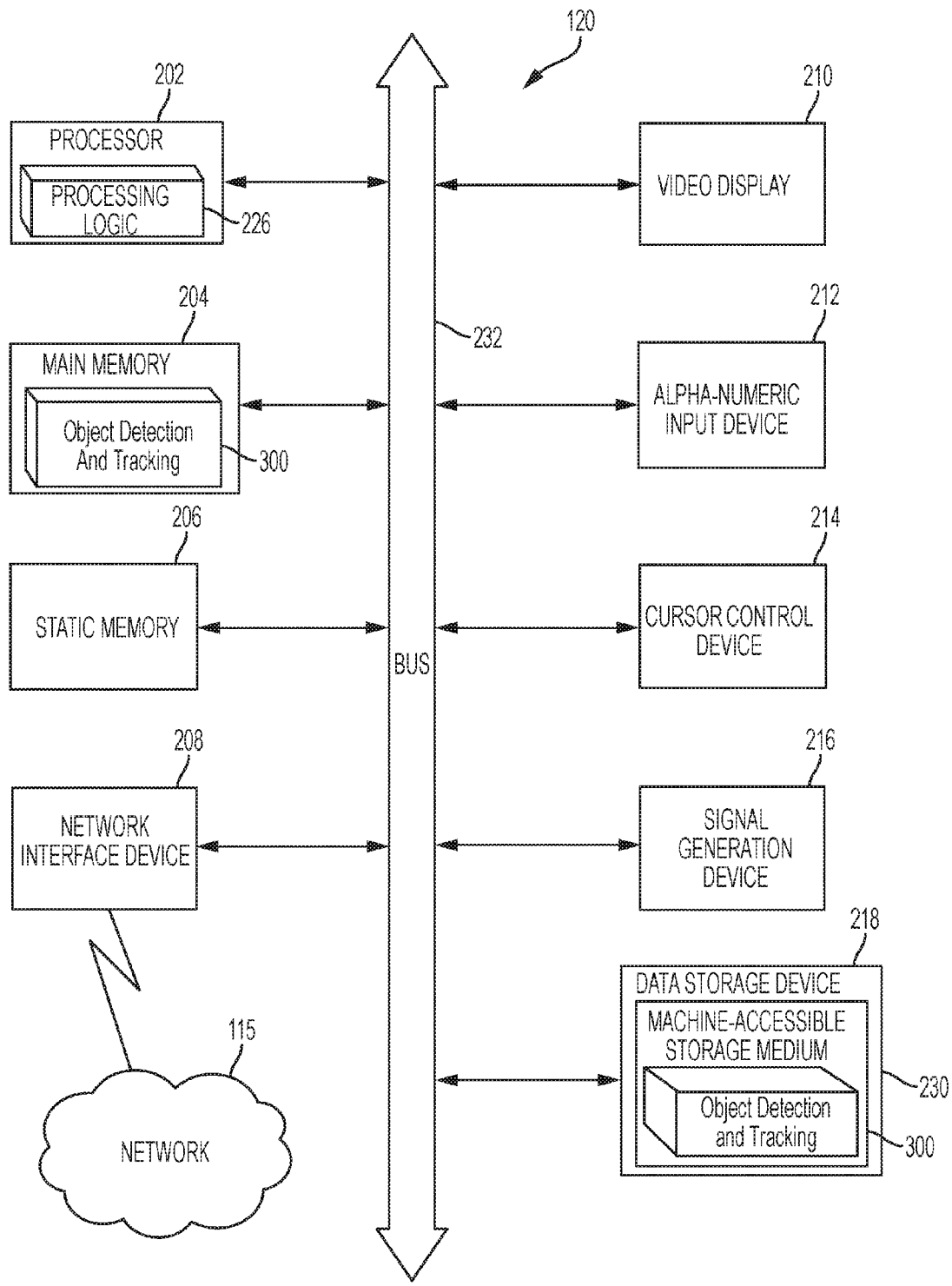
FIG. 2A is a schematic diagram of a computer, such as the Object Detection and Tracking server of FIG. 1, that is suitable for use in various embodiments.

FIG. 2A illustrates a diagrammatic representation of the architecture for the Object Detection and Tracking Server 120 that may be used within the system for detecting, identifying and tracking objects over time 100. It should be understood that the computer architecture shown in FIG. 2A may also represent the computer architecture for anyone of the One or More Remote Computing Devices 110*a*, 110*b*, 110*c* shown in FIG. 1 or for the computer components in an imaging device. In particular embodiments, the Object Detection and Tracking Server 120 may be suitable for use as a computer within the context of the system for detecting, identifying and tracking objects over time 100 that is configured for capturing (e.g., and/or receiving an image captured by a suitable imaging device) an image at a particular time, performing object detection and identification analysis on the image, and storing information associated with the image and the particular time.

In particular embodiments, the Object Detection and Tracking Server 120 may be connected (e.g., networked) to other computing devices in a LAN, an intranet, an extranet, and/or the Internet as shown in FIGS. 1A and 1B. As noted above, the Object Detection and Tracking Server 120 may operate in the capacity of a server or a client computing device in a client-server network environment, or as a peer computing device in a peer-to-peer (or distributed) network environment. The Object Detection and Tracking Server 120 may be a desktop personal computing device (PC), a tablet PC, a set-top box (STB), a Personal Digital Assistant (PDA), a cellular telephone, a web appliance, a network router, a switch or bridge, or any other computing device capable of executing a set of instructions (sequential or otherwise) that specify actions to be taken by that computing device. Further, while only a single computing device is illustrated, the term "computing device" shall also be interpreted to include any collection of computing devices that individually or jointly execute a set (or multiple sets) of instructions to perform any one or more of the methodologies discussed herein.

An exemplary Object Detection and Tracking Server 120 includes a processing device 202, a main memory 204 (e.g., read-only memory (ROM), flash memory, dynamic random access memory (DRAM) (such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose or specific processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The Object Detection and Tracking Server 120 may further include a network interface device 208. The Object Detection and Tracking Server 120 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computing device-accessible storage medium 230 (also known as a non-transitory computing device-readable storage medium or a non-transitory computing device-readable medium) on which is stored one or more sets of instructions (e.g., an Object Detection and Tracking Module 300) embodying any one or more of the methodologies or functions described herein. The Object Detection and Tracking Module 300 may also reside, completely or at least partially, within the main memory 204 and/or within the processing device 202 during execution thereof by the computing device 120—the main memory 204 and the processing device 202 also constituting computing device-accessible storage media. The Object Detection and Tracking Server 120 may further be transmitted or received over a network 115 via a network interface device 208.

While the computing device-accessible storage medium 230 is shown in an exemplary embodiment to be a single medium, the term "computing device-accessible storage medium" should be understood to include a single medium or multiple media (e.g., a centralized or distributed database, and/or associated caches and servers) that store the one or more sets of instructions. The term "computing device-accessible storage medium" should also be understood to include any medium that is capable of storing, encoding or carrying a set of instructions for execution by the computing device and that cause the computing device to perform any one or more of the methodologies of the present invention. The term "computing device-accessible storage medium" should accordingly be understood to include, but not be limited to, solid-state memories, optical and magnetic media, etc.

Figure 2B:
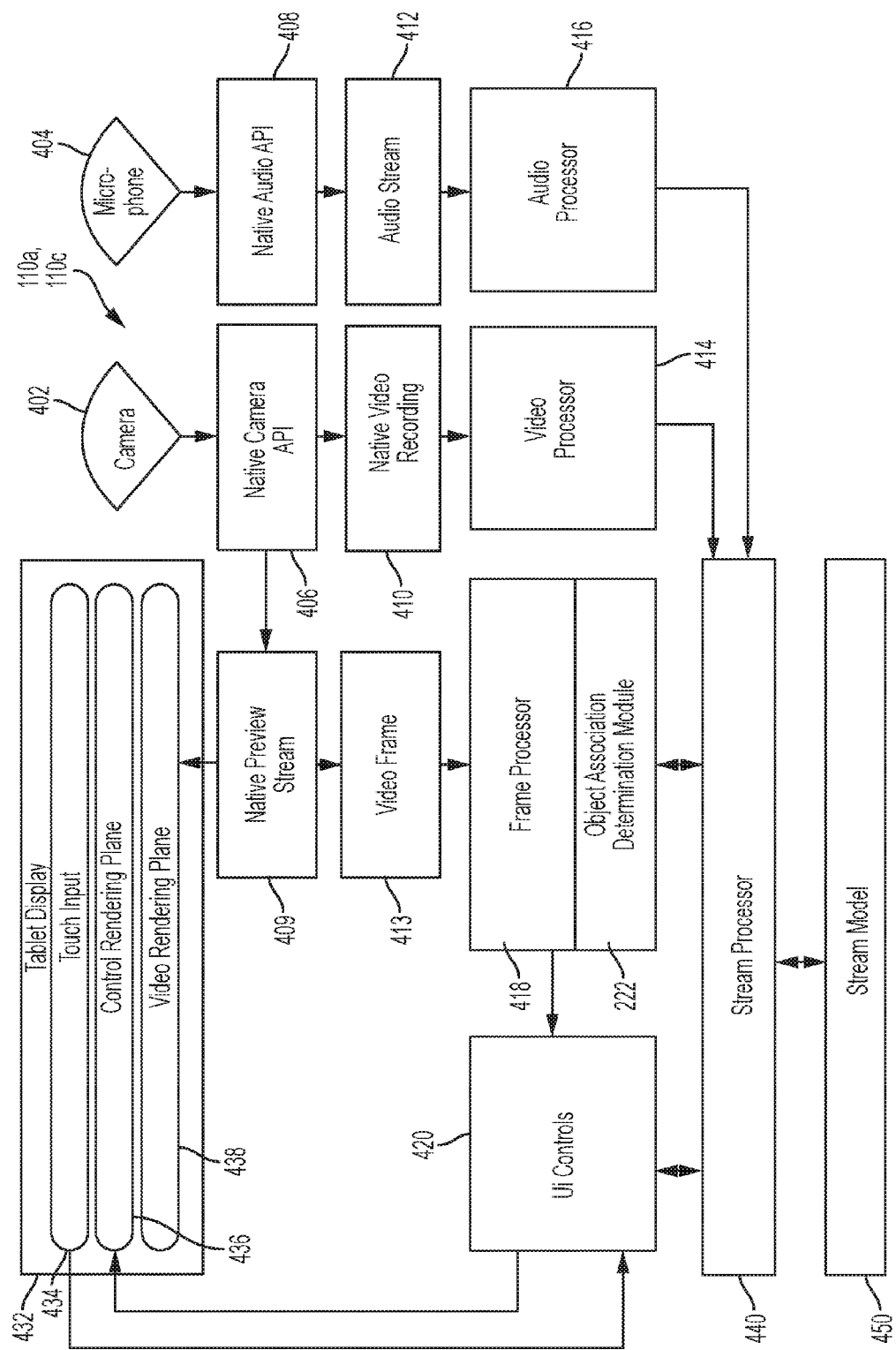
FIG. 2B depicts a schematic diagram of an object detection and tracking system in accordance with an embodiment of the present system.

FIG. 2B illustrates a diagrammatic representation of the architecture for the one or more Remote Computing Devices 110*a* and 110*c* that can be used within the system for detecting, identifying and tracking objects over time 100. In various embodiments, the One or More Remote Computing Devices 110*a* and 110*c* may be embodied as a Tablet Computer 110*a* comprising a Camera 402 and a Microphone 404. The Tablet Computer 110*a*, in this embodiment, is configured to utilize an application programming interface (API) to access the Camera 402 and Microphone 404. The Tablet Computer 110*a* may, for example utilize a Native Camera API 406 to access the Camera 402 and a Native Audio API 408 to access the Microphone 404. In this embodiment, the Tablet Computer 110*a* may be configured to use the Native Camera API 406 and the Native Audio API 408 to capture a Native Video Recording 410 and an Audio Stream 412 from the Camera 402 and Microphone 404 respectively. The Tablet Computer 110*a* in this embodiment is further configured to provide the captured Native Video Recording 410 through a Video Processor 414 and the Audio Stream 412 through an Audio Processor 416. The video output from Video Processor 414 and Audio Processor 416 is sent to a Stream Processor 440, as described in greater detail below.

The Tablet Computer 110*a* includes a Tablet Display 432 on which the Tablet Computer 110*a* is configured to display, via a Video Rendering Plane 438, the Native Preview Stream 409 in addition to various UI Controls 420 that are displayed on a Control Rendering Plane 436. The Tablet Computer 430 further comprises a Touch Input 434, which the teacher may utilize to control various features of the Tablet Computer 110*a*.

The Tablet Computer 110a is further configured to extract a video frame using a Video Frame Extractor 413 from the Native Preview Stream 409. The Tablet Computer 110a sends the extracted video frame through a Frame Processor 418, which is generally configured to perform the functions describe below with respect to the Object Detection and Tracking Module 300. The Frame Processor 418 may, for example, perform: (1) change detection between the frame and a previous frame; (2) face detection; (3) face recognition; (4) content detection; and (5) content recognition. The Tablet Computer 110a is also configured to feed particular events and object associations to a Stream Processor 440 that is configured to create a Stream Model 450 that includes a timeline of the various events and object association information compiled by the system.

For purposes of this disclosure: (1) the term "media" should be broadly interpreted to include a video, picture, environmental state (e.g., light, darkness, temperature, etc.) captured within the stream; (2) the term "stream" should be broadly interpreted to mean a timeline on which event information and media is placed and processed to build further contextual metadata (i.e., information inferred from taking multiple objects on a stream and identifying patterns between the objects); and (3) the term "object" should be broadly interpreted to mean an identifiable entity (e.g., documents, expressions associated with people, projects, activities, any person, place or thing) that exists within the stream.

In various embodiments where the Camera 402, the Microphone 404 and the Tablet Display 432 are integrated, the Tablet Computer 110a is configured to carry out the steps of media capture, media ingestion, media processing, and media persistence. In particular, the Tablet Display 432, the Camera 402, the Microphone 404, the Native Camera API 406, the Native Audio API 408 and the Native Preview Stream 409 together function to capture media, which is handled through the hardware and operating system level tools available on the Tablet Computer 110a. The only exception to this is when media is uploaded to the Tablet Computer 110a (e.g., documents or photos are scanned in and send to the Tablet Computer 110a). In particular, the Tablet Display 432, the Camera 402, and the Microphone 404 are hardware that is resident in the Tablet Computer 110a. Furthermore, the Native Camera API 406, the Native Audio API 408 and the Native Preview Stream 409 are all APIs that are part of the Tablet Computer 110a operating system.

Additionally, media ingestion, the process of detecting changes of interest in the media, detecting objects of interest, and responsively augmenting live video feeds on the device, is carried out by the Native Camera API 406, the Native Audio API 408, the Native Preview Stream 409, the Audio Stream 412, the Native Video Recoding 410, the Video Frame Extractor 413, the Audio Processor 416, the Video Processor 414, the Frame Processor 418, and the UI Controls 420. The Video Processor 414, the Audio Processor 416, the Frame Processor 418, and the UI Controls 420 are all controllers that are part of the Tablet Computer 110a and contain a series of software plugins that configure the controllers to perform detection of object types and association of metadata (e.g., location coordinates, compass direction, camera depth of field, etc.) with the piece of media placed on the stream.

Media processing, the deeper level processing where detected objects are processed to determine if the objects are recognizable, is generally carried out by the Audio Processor 416, the Video Processor 414, the Frame Processor 418, the UI Controls 420, and the Stream Processor 440. Finally, media persistence, the management of the local and online storage of media, low fidelity and high fidelity synchronization between the Tablet Computer 110a and the Object Detection and Tracking Server 120, and the intelligent caching and lifecycle of local media on Computer Tablet 110a is carried out by the Stream Model 450.

It should be understood that although the architecture embodiment described immediately above is illustrated in the context of a Tablet Computer 110a, the architecture may describe similar systems such as a system having a remote smart imaging device, a remote computing device that does not have a display, or any other suitable system. In various embodiments, any of the above described processes and architecture may be performed and/or embodied in any suitable combination of devices. For example, a smart camera may capture images and audio using the Camera 402 and Microphone 404, perform all of the processing on internal processors (e.g., Video Processor 414, Audio Processor 416, Frame Processor 418) and then transmit a Native Preview Stream 409, Stream Model 450 or other output to a second remote computing device (e.g., server or distributed cameras) for viewing by a user or for further processing.

Figure 2C:
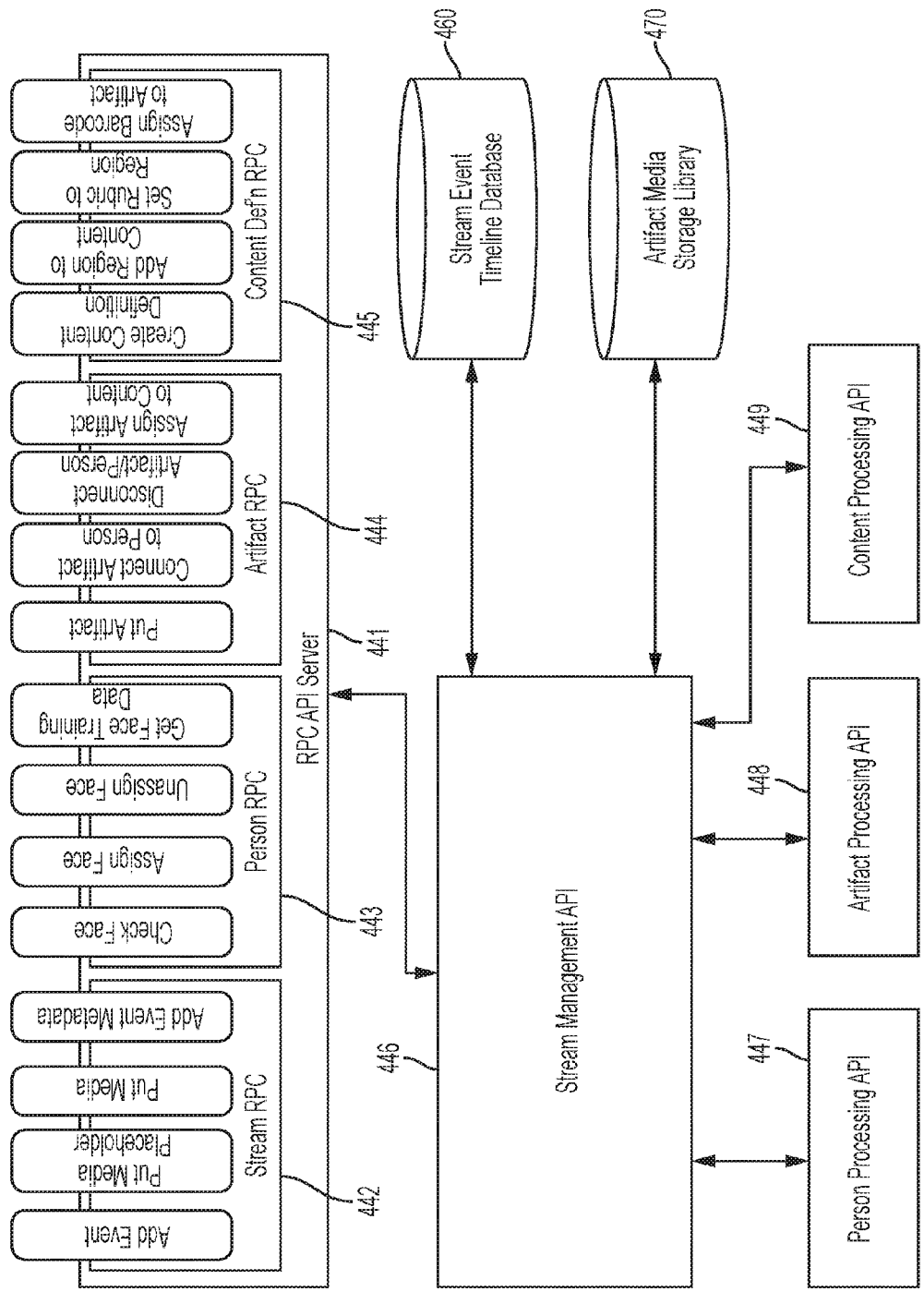
FIG. 2C depicts a schematic diagram of multiple APIs that allow the computer of FIG. 2A to interact with the system of FIG. 2B.

FIG. 2C illustrates a diagrammatic representation of a Remote Procedure Call (RPC) API Server 441 according to a particular embodiment that can be used within the system for detecting, identifying and tracking objects over time 100, in particular to produce a stream of captured data (e.g., a timeline). In particular embodiments, the RPC API Server 441 in FIG. 2C may be the Object Detection and Tracking Server described above. In other embodiments, RPC API Server 441 may be embodied as any other suitable computing device, such as any computing device described in this disclosure. In various embodiments, the RPC API Server 441 is configured to compile events (e.g., from one or more remote computing devices or servers) and associated data into a timeline or data stream. In particular embodiments, the RPC API Server 441 is configured to utilize RPC to enable data exchange and invocation of functionality residing in a different process. In particular embodiments, the process may be on the same computing device, on a computing device connected to the RPC API Server 441 via one or more suitable networks (e.g., the one or more Remote Computing Devices 110a, 110b, 110c) or across the Internet.

As may be understood from FIG. 2C, the RPC API Server 441 utilizes various RPCs to manage data for creation of a stream timeline. The RPC API Server 441 utilizes a Stream RPC 442, for example, to: (1) add an event to the stream; (2) put a media placeholder for the event in the stream; (3) put the media in the stream; and (4) add event metadata to the stream for the event. In various embodiments, the event may include any suitable event such as, for example, identification of an object in a captured image, or any other suitable event. When creating the stream (e.g., in real time as an event occurs), the RPC API Server 441 may utilize the Stream RPC 442 to place a media placeholder for the event in the stream that the system will later fill in with the relevant media. In various embodiments, for example, when performing image analysis, the one or more remote computing devices 110a and 110c may have insufficient system resources to transmit media associated with a particular event (e.g., one or more videos, audio, one or more images, etc.) at the time the event occurs. In various embodiments, the system is configured to import a higher resolution version or complete version of particular media at a later stage. In particular embodiments, the event metadata may include any suitable metadata related to the event, such as, for example, camera orientation when an image was captured, or any other suitable metadata.

In various embodiments, the RPC API Server 441 is configured to utilize a Person RPC 443 to, for example: (1) check a face detected in a captured image; (2) assign the face to a particular person's identity; (3) unassign a face from a particular person's identity; and (4) get face training data. In various embodiments, the system may be configured to substantially automatically perform the step of assigning and unassigning a face to a particular person's identity. In other embodiments, the system is configured to receive confirmation of an assigned face from a user (e.g., via a remote computing device).

In various embodiments, the RPC API Server 441 is configured to utilize an Artifact RPC 444 to, for example: (1) add an artifact to a particular event; (2) connect the artifact to a person detected at the particular event; (3) disconnect an artifact from a person detected at the event; and (4) assign the artifact to content. In various embodiments, an artifact may include any object other than a person. In various embodiments, content may include content of a particular document, where the artifact includes a document. For example, a worksheet of math problems may include content that comprises the math problems. In various embodiments, the RPC API Server 441 is configured to utilize a Content Definition RPC 445, for example, to: (1) create content definition for a particular artifact; (2) add one or more regions to the content (e.g., problem region, answer choice reason, solution region, etc.); (3) set a rubric to the region (e.g., an answer key for the various problems); and (4) assign a barcode to the artifact, which the system may use, for example, to identify the artifact for detection purposes as well as grading purposes using the rubric.

In particular embodiments, the RPC API Server 441 interacts with a Stream Management API 446, a Person Processing API 447, an Artifact Processing API 448, and a Content Processing API 449. In various embodiments, the Person Processing API 447 functions to process images captured by remote computing devices that have been transferred to the RPC API Server 441. In various embodiments, the Person Processing API 447 further functions to detect and identify one or more people in particular captured images, for example, using any suitable technique such as any of the techniques described in this disclosure. Similarly, the Artifact Processing API 448 functions to perform detection and identification analysis on captured images at the server level. In particular embodiments, the Content Processing API 449 functions to create content definitions for artifacts identified by the RPC API Server 441.

In various embodiments, the RPC API Server 441 is configured to utilize a Stream Management API 446 to compile data collected via the various system RPCs discussed above as well as person, artifact, and content data collected by the RPC API Server 441 for particular events to create a unified timeline. In various embodiments, the RPC API Server 441 is configured to store the complied timeline and associated artifact data via the stream Management API 446 in a Stream Event Timeline Database 460 and Artifact Media Storage Library 470. Said another way, the RPC API Server 441 is essentially configured to compile one or more streams from one or more remote computing devices into a single stream.

Exemplary System Platform

Various embodiments of the system for detecting, identifying and tracking objects over time 100 and determining associations between/among various items of interest are described below and may be implemented in any suitable context. For example, particular embodiments may be implemented within the context of a school classroom to associate one or more students with particular objects (e.g., class papers, projects, etc.) on which the students may be working or in particular classrooms in the case of taking attendance in the classroom. Various aspects of the system's functionality may be executed by certain system modules, including an Object Detection and Tracking Module 300, which may, for example, be executed as part of an Object Detection and Tracking Mobile Application 112, Object Detection and Tracking Web Application 114, and/or Object Detection and Tracking Native Application 116 as discussed with regard to FIG. 1B above. It should be understood that in various embodiments, when executing the Object Detection and Tracking Module 300, the system may be configured to omit particular steps, perform additional steps to those outlined below, or perform the below described steps in an order other than the order in which they are presented. The Object Detection and Tracking Module 300 is discussed in greater detail below.

Exemplary System Platform

Various embodiments of a system for detecting, identifying and tracking objects of interest are described below and may be implemented in any suitable context. For example, particular embodiments may be implemented within the context of school classroom to track attendance of one or more students in a particular class. Various aspects of the system's functionality may be executed by certain system modules, including an Object Detection and Tracking Module 300. This module is discussed in greater detail below.

Object Detection and Tracking Module

Figure 3:
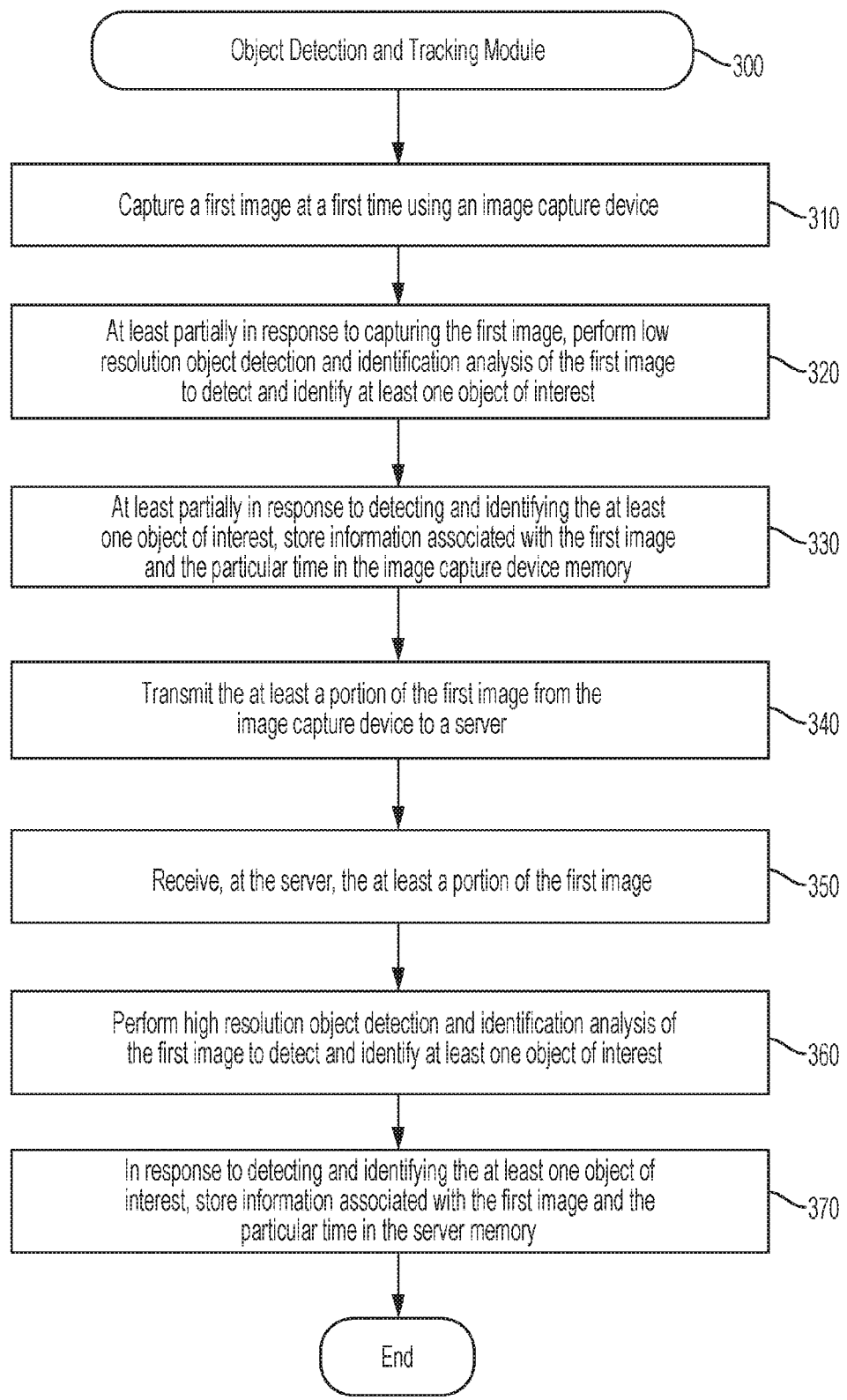
FIG. 3 depicts a flow chart that generally illustrates various steps of an object tracking and detection module that is executed by the object detection and tracking system.

When executing the Object Detection and Tracking Module 300 (as shown in FIG. 3), the system begins, in various embodiments, at Step 310 by capturing a first image at a first time using an image capture device. In various embodiments, the system is configured to capture the first image using a suitable imaging device, which may, for example, comprise one or more cameras and one or more processors. In particular embodiments, the first imaging device comprises one or more remote cameras (e.g., one or more mounted cameras) which may, for example, be located in an area of interest and positioned to capture the area of interest with the camera view. In various embodiments, the system is configured to capture the first image from a video stream taken by an imaging device. The system may, for example, be configured to capture the first image by taking a screen shot of a video feed or isolating an individual frame of the video feed.

In some embodiments, the system is configured to capture the first image using a suitable mobile computing device equipped with one or more cameras such as, for example, a suitable smartphone (e.g., an iPhone, Android phone, etc.), suitable tablet computer (e.g., iPad, Microsoft Surface Tablet etc.), suitable wearable computing device (e.g., such as Google Glass, etc.), or any other suitable mobile computing device capable of capturing one or more images. In particular embodiments, the suitable imaging device comprises a suitable infrared camera, night vision camera, or other suitable camera.

The system continues, in various embodiments, at Step 320 by, at least partially in response to capturing the first image, performing low resolution object detection and identification analysis of the first image to detect and identify at least one object of interest. In various embodiments, the at least one object of interest may include, for example, one or more persons, one or more items, such as: one or more papers; one or more bags; one or more weapons; one or more items being held by the one or more persons; or any other suitable items. In particular embodiments, such as in a security environment, the system may be configured to identify weapons, explosives, or other dangerous items as well as people and any other suitable objects which may be useful to identify for security purposes. In another particular example, the system may be configured, when utilized in a classroom setting, to identify one or more students as well as one or more projects on which the one or more students may be working on, one or more assignment papers that the one or more students may be completing, or any other suitable object related to education or the classroom setting.

In particular embodiments, the system is configured to perform object detection and identification analysis, for example using suitable facial recognition techniques. The system may, for example, be configured to compare one or more facial features of a face identified in the first image with a facial database (e.g., which may be stored locally (in whole or in part) on the imaging device that captured the first image or remotely on one or more servers). In particular embodiments, the system may analyze a relative position, size, and/or shape of the eyes, nose, cheekbones, jaw, and other features of an identified face. In particular embodiments, the system is configured to use suitable 3-dimensional face recognition techniques, which may, for example, identify a face in the first image based at last in part on distinctive features on the surface of a face, such as the contour of the eye sockets, nose and chin. In still other embodiments, the system may identify a face as at least one object of interest based at least in part on skin texture analysis. The system may, for example, analyze one or more unique lines, patterns, and spots apparent on a face's skin to identify the face as belonging to a particular person in the image.

In particular embodiments, the system is configured to identify a face as a particular person with at least a particular certainty. In some embodiments, the system may be unable to identify a particular face as a particular person, for example, because the system has insufficient data with which to compare the particular face for identification purposes (e.g., because the system has never 'seen' the person before, or for any other suitable reason). In various embodiments, the system is configured to prompt a user of the system to confirm an identity of a particular face. The system may, for example: (1) make a determination that an identified face is a particular person below a particular certainty threshold; (2) prompt the user to confirm that the identified face is the particular person; and (3) at least partially in response to receiving confirmation from the user, adding the identified face to a database associated with the particular person (e.g., for use in subsequent identifications). In various embodiments, the system is configured to use a suitable machine learning algorithm to intelligently learn and improve its facial recognition ability. The system may, for example, use data points derived from user confirmation or correction of identified faces to improve future identification of faces by using the new data points. The system may, for example, store information associated with the particular face such as, for example, a relative position, size, and/or shape of the eyes, nose, cheekbones, jaw, and other features of the particular face and associate that information with the particular individual that was confirmed by the user as having that particular face.

As an example, in a situation in which the system is utilized in a classroom setting to take attendance of students present in the class, the system may prompt the teacher of the class to confirm that a face identified by the system as Student X is, in fact, Student X. The teacher may then provide the system with confirmation that the student is Student X, or a correction that the face is that of another student. In various embodiments, the system may also be configured to prompt a user to provide an identification for a face that the system is unable to identify (e.g., because the face is a face that the system has never seen before, or has insufficient data about to identify as a particular person).

In still other embodiments, the system may be configured to perform object detection and identification analysis that includes a suitable object identifying technique. The system may, for example, identify one or more unique markings on a particular object in order to identify (e.g., recognize) the particular object. For example, a piece of paper may have an identifying feature that includes suitable machine readable indicia (e.g., a barcode, QR code, or other suitable indicia). In another example, an object such as a backpack or suitcase may have a distinguishing mark such as a tag, scuff, sticker, or other distinguishing mark. In other embodiments, the system may be configured to identify a marking using suitable Optical Character Recognition (OCR) techniques. A piece of paper may, for example, include the words "Test Form B" at the top. The system may be configured to identify the piece of paper as a paper containing "Test Form B" by using OCR techniques to identify the words "Test Form B" on the paper. Alternatively, the system may be configured to identify one or more stray markings on the paper, which may, for example, have been made by one or more persons (e.g., a doodle in the margin of the paper, a person's name written on the paper, etc.). In other embodiments, the system may be configured to detect and identify the at least one object of interest using suitable handwriting analysis techniques in order to, for example, identify a name written on a piece of paper.

In various embodiments where the system is configured to recognize backpacks, suitcases or other objects, the objects may contain a low power identifier (e.g., low power Bluetooth transmitter, an RFID tag, etc.) that a sensor coupled to the system may read to identify the object. In other embodiments, the object may contain a QR code or other type of marking that is printed in infrared or ultraviolet ink so that the marking is not visible to the naked eye but may be visible to the camera. In particular embodiments, such as in a school setting, the system may identify people by detecting computing devices associated with the person. This could be achieved by detecting identification devices worn by the person (e.g., RFID bracelet, Bluetooth emitting device, etc.). The identification may then be confirmed using the facial recognition techniques described above.

Continuing at Step 330, the system, in various embodiments, at least partially in response to detecting and identifying the at least one object of interest, stores information associated with the first image and the particular time in the image capture device memory (e.g., internal memory, in a local database, etc.). In particular embodiments, the information comprises information associated with the first image such as information about the at least one detected object of interest as well as identifying information for the at least one object of interest. Other suitable information may include, but not be limited to, metadata associated with the layout of pages, scoring criteria (in the case where one of the objects is a test paper) and other key information about a particular object (e.g. location coordinates of the camera, compass direction, camera depth of field, etc.). For example the term "Art History Worksheet #2" may be defined in the system as a test paper and the system may detect multiple instances of objects labeled "Art History Worksheet #2" associated with each student in an Art History class. As a result, the system may associate particular instances of objects labeled "Art History Worksheet #2" with respective students.

At Step 340, the system transmits the at least a portion of the first image from the image capture device to a server. In various embodiments, the image capture device is operatively coupled to one or more servers, for example, via a suitable wireless network (e.g., Wi-Fi, Bluetooth, Near Field Communication, etc.) or via a suitable wired connection. In particular embodiments, the suitable imaging device is further configured to send and/or receive images (e.g., such as the first image) to and/or from the one or more servers. In particular embodiments, the image capture device is configured to transmit the entire first image to the server. In other embodiments, the system is configured to transmit only a portion of the first image to the one or more servers (e.g., a portion of the image comprising at least one object of interest). In particular embodiments, the imaging device is configured to transmit the first image at full resolution (e.g., at a resolution at which the image capture device captured the first image). In still other embodiments, the imaging device is configured to transmit the first image at an at least partially compressed resolution to the one or more servers (e.g., to reduce an amount of bandwidth required to transmit the first image). In particular embodiments, the at least a portion of the first image comprises one or more portions of the first image in which the system detected and identified at least one object of interest at Step 320.

In particular embodiments, the system is configured to transmit the at least a portion of the first image from the image capture device to one or more servers (e.g., a plurality of servers). In particular other embodiments, the system is configured to transmit a first portion of the first image to one or more first servers and a second portion of the first image to one or more second servers. In still other embodiments, the system is configured to transmit a plurality of different portions of the first image to a plurality of different servers. In certain embodiments, transmission of different portions of the first image to different servers may spread out the processing power required to perform the high resolution object detection and identification discussed below between/among one or more servers. Although transmission of the at least a portion of the first image is discussed herein in the context of transmission from the image capture device to a server, it should be understood that the system, in various embodiments, may be configured to transmit the at least a portion of the first image to any suitable computing device, such as any suitable computing device described in this disclosure.

In various embodiments, remote computing devices (e.g., such as desktop computers, tablet computers, smart camera, etc.) have a limited capability to detect and recognize known objects within a media stream (e.g., within a stream of one or more captured images) or within a particular captured image. These devices, however, may have the ability, via software, to determine if a particular piece of media may be of interest. The system may then send the processed media to the server for further verification and learning, affecting the certainty of an identification of a detected object of interest.

Next, at Step 350, the system receives, at the server, the at least a portion of the first image. When receiving the at least a portion of the first image, the system may be configured to at least temporarily store the at least a portion of the first image in memory associated with the server (e.g., server memory). In particular embodiments, the server is a cloud server, which may include more sophisticated machine learning systems and a much larger database of known objects than the remote computing devices that are used by the system to capture images. Such systems may, for example, distribute processing and storage, which may, in various embodiments, at least partially increase speed and object identification (e.g., matching) capabilities.

Continuing at Step 360, the system, in various embodiments, performs high resolution object detection and identification analysis of the first image to detect and identify at least one object of interest. In various embodiments, the high resolution object detection and analysis techniques are substantially similar to those described above with respect to the image capture device. In particular embodiments, the high resolution object detection and identification analysis includes a more detailed analysis than the low resolution analysis. In particular embodiments, high resolution analysis may utilize different object detection and identification algorithms that require more computing power than those algorithms used by the imaging device.

The system continues, at Step 370 by, in response to detecting and identifying the at least one object of interest, storing information associated with the first image and the particular time in the server memory. In various embodiments, the information may include any suitable information, such as any of the information discussed above with respect to Step 330. In particular embodiments, the stored information includes the image captured by the image capture device at Step 310 and may include a higher resolution version or larger portion of the first image than the at least a portion of the first image transmitted at Step 340. Additionally, the stored information may include any suitable metadata associated with the imaging device that captured the image or the image itself.

Alternative Embodiments

Change Detection Prior to Image Analysis

In particular embodiments, the system is configured to detect one or more changes between the first image and a second image taken at an earlier time than the first image before the step of performing object detection and identification analysis on the first image. In various embodiments, in response to detecting no changes or less than a sufficient number of changes from the first to the second image, the system is configured to skip the step of performing object detection and identification analysis (e.g., in order to conserve processing power and/or usage).

In other embodiments, the second image is an image captured by the same imaging device that captured the first image at a time after the first image. In particular embodiments, the second image is an image comprising substantially the same area of interest as the first image taken from substantially the same point of view. In other embodiments, the second image is an image captured by a different imaging device. In some embodiments, the first image and the second image comprise one or more of the same objects. In particular embodiments, the first and second images comprise the one or more of the same objects taken from substantially the same perspective. In other embodiments, the first and second images comprise the one or more of the same objects taken from substantially different perspectives (e.g., taken from one or more different cameras, taken from the same camera from a substantially different location (e.g., a wearable device), etc.).

In particular embodiments, the one or more change criteria comprise a criterion that one or more objects within the first and second image have changed location between the second image and the first image. The system may, for example: (1) identify at least one object in the second image; (2) identify the at least one object in the first image; and (3) determine, based on a relative position of the at least one object to a second object in the second image versus a relative position of the at least one object to the second object in first image, whether the at least one object has moved between the second image and the first image. In embodiments in which the first and second images are captured by the same, substantially fixed camera, the system is configured to detect movement of at least one identified object within the first and second images based at least in part on a position of the at least one object within the first and second image.

In various embodiments, the one or more change criteria comprise a criterion that one or more new objects have appeared between the second image and the first image. The system may, for example, be configured to identify at least one object in the first image that the system could not identify in the second image taken at the earlier time. Similarly, in various embodiments, the one or more change criteria comprise a criterion that one or more objects identified in the earlier, second image have disappeared between the second and first images. The system may, for example, be configured to identify at least one object in the second image that the system is unable to identify in the first image or vice versa.

In some embodiments, the one or more change criteria comprise a criterion that an image histogram of the second image is sufficiently different from an image histogram of the first, earlier captured image. In particular embodiments, the system is configured to detect the one or more changes based at least in part on the image histogram of the first image and the image histogram of the second image. In particular embodiments, the system is configured to create one or more histograms of one or more images. The system may, for example, be configured to create a histogram of the first image, create a histogram of the second image, and compare the histograms of the first and second images to detect that one or more changes have occurred between the second image and the first image. In particular embodiments, the system is configured to create a histogram that acts as a graphical representation of a tonal distribution of an image. In a particular embodiment, the histogram comprises a horizontal axis that represents tonal variations of the image (e.g., brightness) and a vertical axis that represents a number of pixels in that particular tone for the image. When comparing the image histogram of the first and second images, the system may be configured to detect that a change has occurred between the two images in response to determining that there is a sufficient difference between the two image histograms. In other embodiments, the system is configured to detect one or more changes by using a suitable histogram algorithm to detect sufficient change in light, brightness, color or any other suitable image attribute between the second and first images. In some embodiments, sufficient change may constitute a change over a particular threshold. It should be understood that the above discussion focused on finding changes in a complete image, any of the change techniques described above may also be performed on any portion of the first image and a corresponding portion of the second image.

Tracking Objects via a Plurality of Image Capture Devices

In various embodiments, the system is configured to detect and identify at least one object of interest using a plurality of image capture devices (e.g., smart cameras) in a plurality of locations. In various embodiments, the system is configured to capture one or more images of the same at least one object of interest using the plurality of image capture devices at different times. For example, in the context of a school, the system is configured to detect and identify a particular student in one or more images captured by one or more particular image capture devices located in each of the rooms in which the particular student has class over the course of a school day. The system may utilize this information to track the student's attendance in a particular day, over a particular month, semester, school year, or any other suitable time frame. Each particular one of the plurality of image capture devices may be configured to compile a stream from object identification and event data determined by the particular one of the plurality of image capture devices. The system may be further configured to compile the separate streams into a single, unified data stream.

Illustrative Example

In a particular exemplary application of the system, the system is utilized in a school setting to determine student attendance in various courses in which the student is enrolled, identify students that may be in an incorrect class, and detect students that may be new to the school or to a particular class. In this example, a first teacher of a first period class has a first tablet computer that captures an image of the students in the class. The system, using the first tablet computer, detects student faces in the captured image and attempts to identify the various detected faces. In this example, the class has 10 students enrolled and the system detects eleven student faces. The system identifies, using any suitable facial recognition technique, ten of the eleven students as the ten students enrolled in the class. The system identifies the eleventh student as a student that is enrolled in a class with a second teacher during the first period. The system may notify the first teacher of the eleventh student's improper presence in the class room, and the teacher may then take action such as directing the student to the proper class, or following up to determine whether the student may have switches classes, or take any other suitable action.

Continuing this example, the second teacher has a third period class of fifteen students and a second tablet computer. The system uses the second tablet computer to capture an image of the second teacher's third period class and performs low level object detection and identification analysis on the image. The system detects fourteen faces in the image and identifies thirteen of the fourteen students as students that are enrolled in that particular class. The system is unable to identify the fourteenth student, so the system prompts the second teacher, via the second tablet computer, to identify the fourteenth student. The second teacher identifies the fourteenth student as 'Student Y' whose face may have been partially obstructed in the captured image by a hat that he was wearing. The system then adds the portion of the image that includes Student Y's partially obscured face to a database and associates the partial image with Student Y to enable the system's machine learning algorithm to better identify Student Y in the future. The system then determines that the fifteenth student, who is missing, was present in the first teacher's first period class, notifies the teacher of the fifteenth students questionable absence, and adds the information to event data associated with the captured image.

The system then transmits the captured image from the second tablet to a server that performs high level object detection and analysis on the image. The server identifies all fourteen students, including Student Y. The system then collects all object identification data for all classes for the day, and compiles attendance data for every class in the school for the day. The system enables users to access these compiled data streams for all school days to investigate attendance patterns for various students.

User Experience

Figure 4:
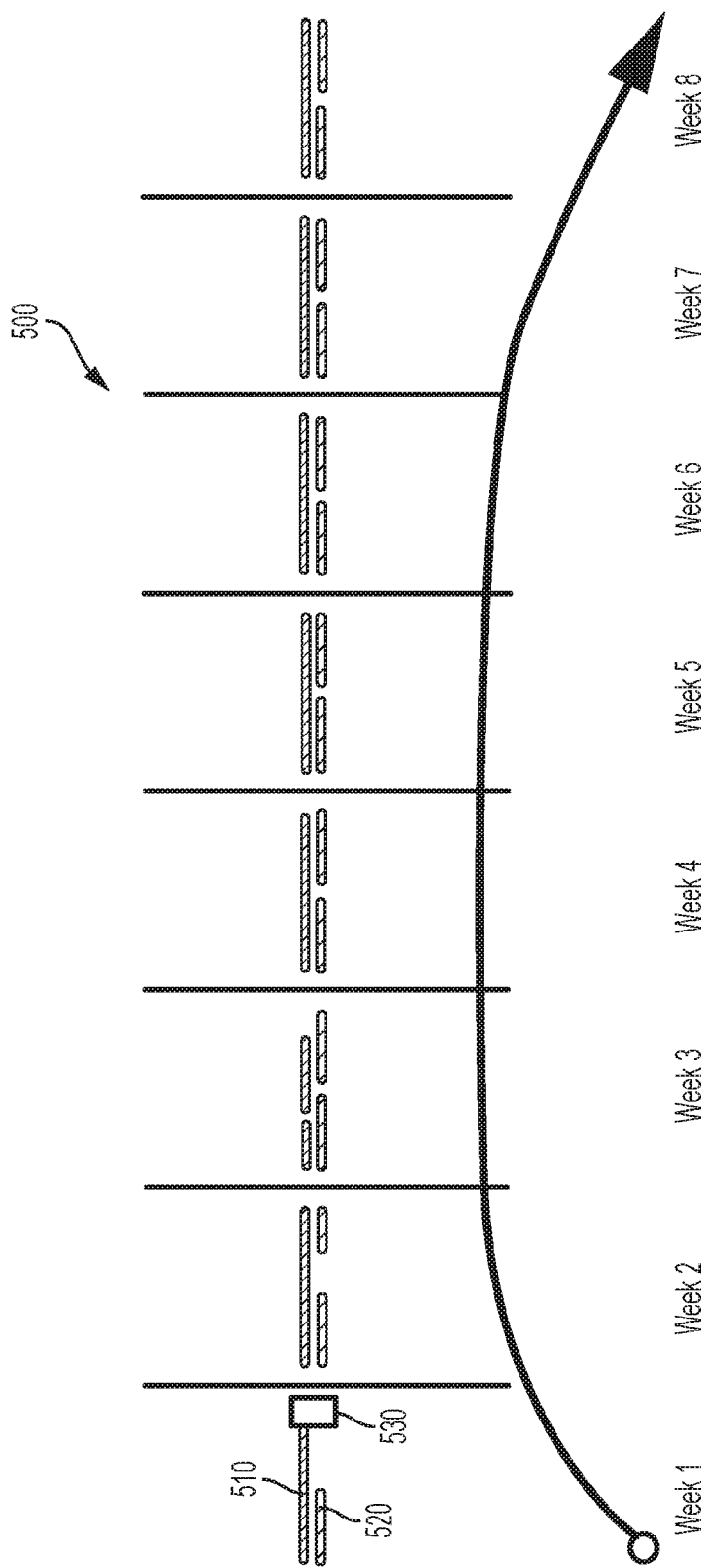
FIGS. 4-6 depict exemplary screen displays for enabling a user to view particular object data.
Figure 5:
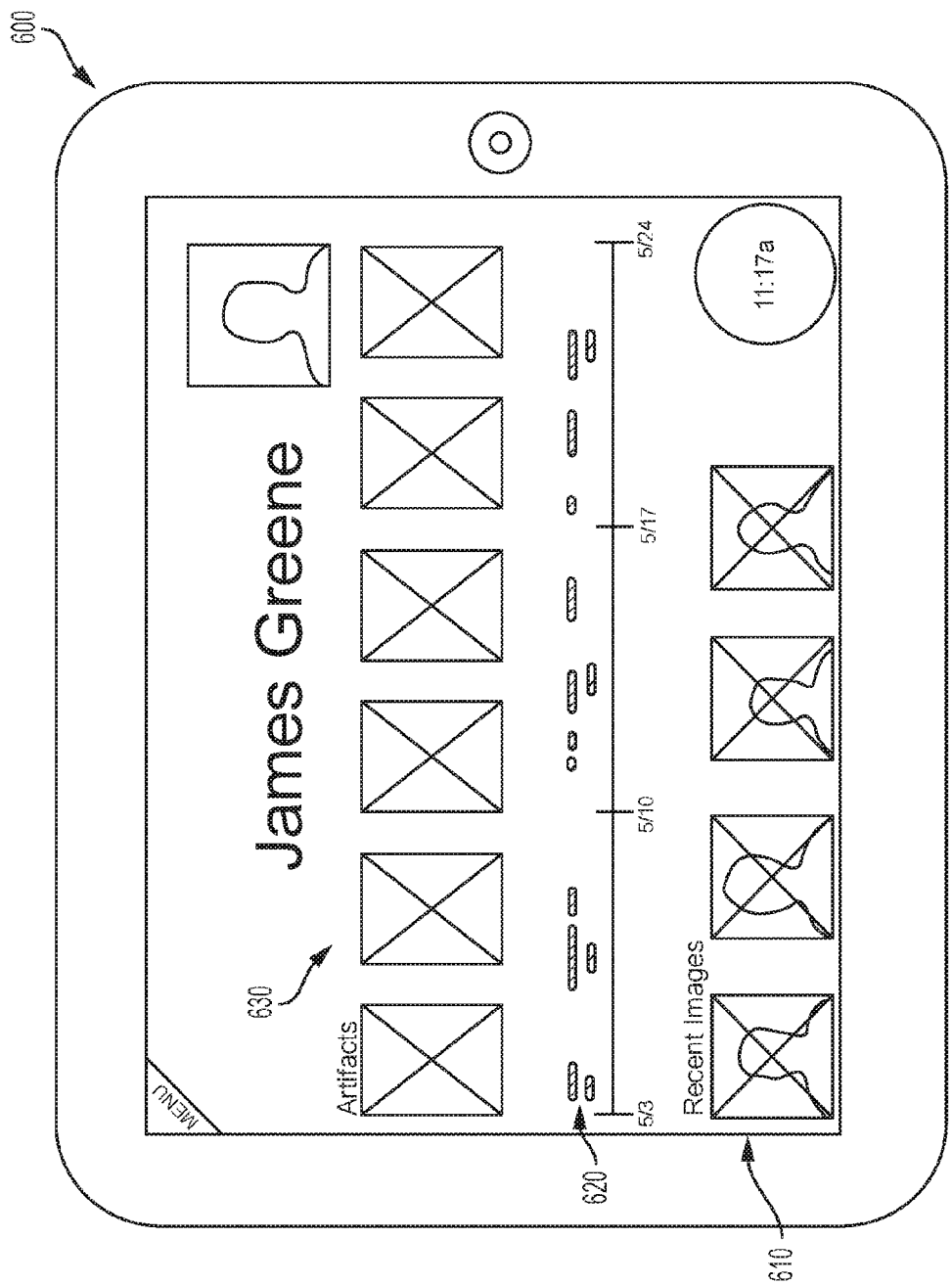
Figure 6:
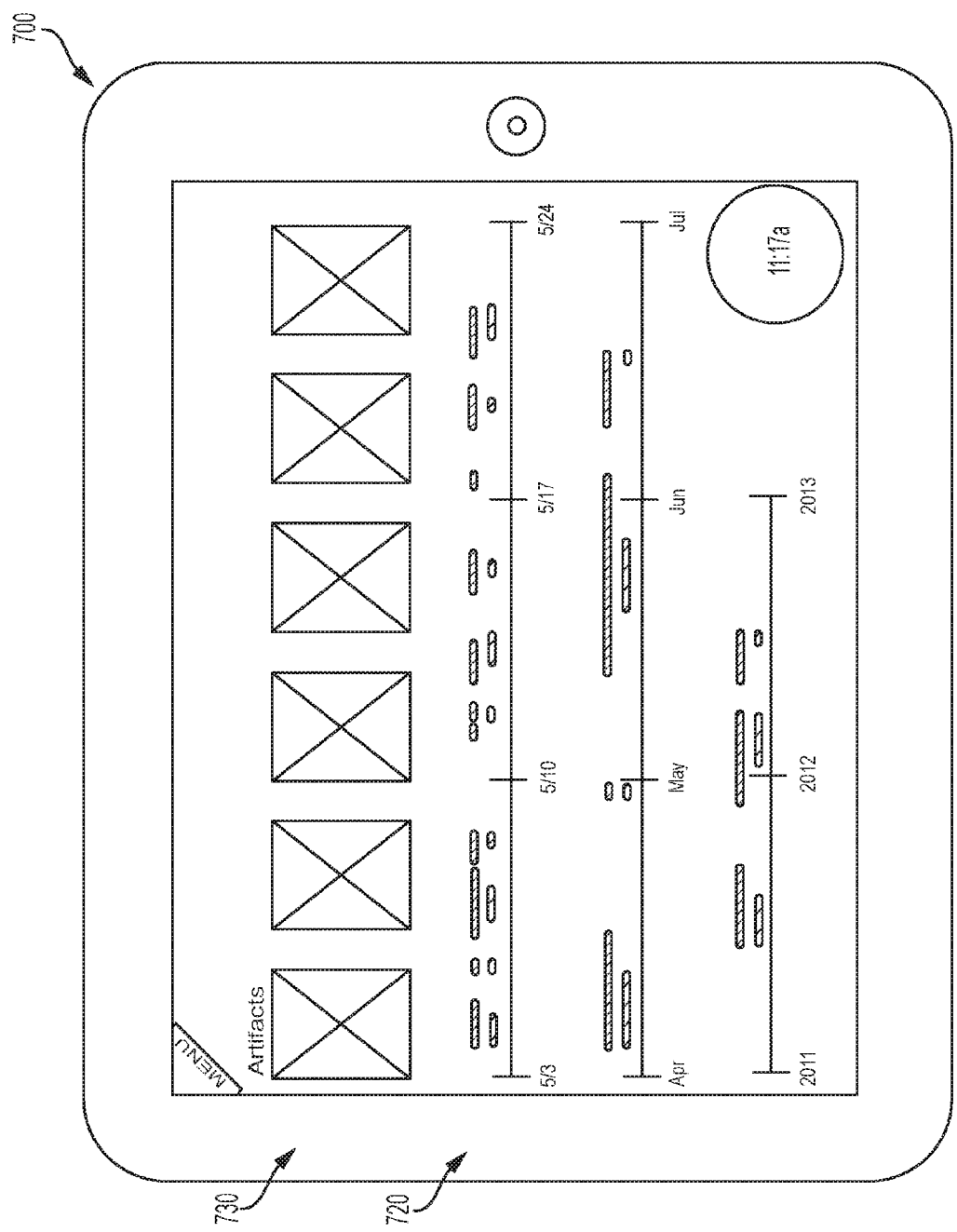

FIGS. 4-6 depict exemplary screen displays which a user may experience when using the system to access a timeline of data for a particular object. FIG. 4 depicts a timeline 500 that illustrates a period of eight weeks of object detection data. As may be understood from this figure, the timeline includes lines representing first objects 510 and second objects 520 that show times during the eight weeks at which the one or more of the first objects and second objects were detected and identified. The timeline 500 further comprises a portion 530 in which neither first nor second objects were identified in any images captured during that period. In various embodiments, users may use the timeline 500 to examine times at which particular objects were detected. For example, the first object 510 may represent a particular classroom and 520 may represent students associated with the classroom. Thus, when a user clicks on the line 510 the system may be configured to zoom in to a particular day in the week so that the user can see all students associated with the classroom on that day.

FIG. 5 depicts an exemplary screen display 600 of object data for a particular individual (e.g., Student Z) over a three week period. The screen display 600 further depicts objects 630 (e.g., artifacts) detected during the same period. In addition to viewing detection data, the user may also view one or more specific instances of an object being detected over time to see the progression of the detection over time (e.g., the person's attendance over time.)

As may be understood from FIG. 5, a user may select other individuals for whom to view detection data by selecting their picture from the list of pictures 610. The user may then view a timeline 620 of detection data for the selected picture over the illustrated period of time.

FIG. 6 depicts another exemplary screen display 700 depicting timelines 720 of object detection over various time periods. A user may select a particular object icon from the list of object icons 730 to view detection data for the selected objects. For example, in the case of an instance of a teacher desiring to see which students were not present for a particular assignment, the system may be configured to show all people detected on the date the assignment was given or all people not present who should have been present.

CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A system for detecting and tracking one or more events in an area of interest, the system comprising an image capture device comprising one or more cameras, at least one processor operatively coupled to the one or more cameras and memory operatively coupled to the at least one processor, wherein the at least one processor is configured to:

a. capture a first plurality of images at the area of interest between a first start time and a first stop time;
   b. after capturing each one of the first plurality of images, analyze each one of the first plurality of images using a first detection method to detect a presence of one or more objects;
   c. after capturing each one of the first plurality of images, analyze each one of the first plurality of images using a second detection method to detect a presence of one or more faces near the one or more objects;
   d. in response to detecting the presence of the one or more objects, analyze each one of the first plurality of images using a third detection method to recognize each one of the one or more objects;
   e. in response to detecting the presence of the one or more faces near the one or more objects, analyze each one of the first plurality of images using a fourth detection method to recognize each one of the one or more faces; and
   f. store in the memory information about each one of the one or more recognized faces and objects and a particular time when the respective one or more recognized faces and objects were captured in the image.

2. The system of claim 1, wherein the system is further configured to:

a. analyze each one of the first plurality of images to associate one or more of the recognized objects with one of the one or more of the recognized faces; and
   b. store in memory information about each association between the one or more of the recognized objects with the one of the one or more of the recognized faces.

3. The system of claim 2, wherein associating one or more of the recognized objects with one of the one or more of the recognized faces is associated based on proximity between the one or more recognized objects and the one of the one or more recognized faces.

4. The system of claim 1, wherein the system is further configured to:

a. analyze each one of the first plurality of images to determine a presence of one or more machine readable indicia that identify one or more of the recognized objects;
   b. analyze each one of the one or more machine readable indicia to associate one or more of the recognized objects with one of the one or more of the recognized faces; and
   c. store in memory information about each association between the one or more of the recognized objects with the one of the one or more of the recognized faces.

5. The system of claim 1, wherein the system is further configured to:

a. capture a second plurality of images at the area of interest between a second start time and a second stop time;
   b. after capturing each one of the second plurality of images, analyze each one of the second plurality of images using the first detection method to detect a presence of one or more objects;
   c. after capturing each one of the second plurality of images, analyze each one of the second plurality of images using the second detection method to detect a presence of one or more faces near the one or more objects;
   d. in response to detecting the presence of the one or more objects, analyze each one of the second plurality of images using the third detection method to recognize each one of the one or more objects;

e. in response to detecting the presence of the one or more faces near the one or more objects, analyze each one of the second plurality of images using the fourth detection method to recognize each one of the one or more faces; and
f. store in the memory information about each one of the one or more recognized faces and objects and a particular time when the respective one or more recognized faces and objects were captured in the second plurality of images.

6. The system of claim 5, wherein the system is further configured to store metadata associated with the first plurality of images and the second plurality of images.

7. The system of claim 5, wherein the system is further configured to:
a. for each particular time when the respective one or more recognized objects was captured in the memory, determine a position within the area of interest of the one or more recognized objects; and
b. store information identifying a position pattern in the area of interest of the one or more recognized objects based on each particular time when the respective one or more recognized objects was captured in the memory.

8. The system of claim 7, wherein the position within the area of interest is determined based on location coordinates implemented in the image capturing device.

9. The system of claim 7, wherein the system is further configured to determine that one of the one or more of the recognized objects has been removed from the area of interest based on the position pattern for each of the one or more recognized objects.

10. The system of claim 5, wherein the system is further configured to:
a. analyze each one of the second plurality of images to associate one or more of the recognized objects with one of the one or more of the recognized faces; and
b. store in memory information about each association between the one or more of the recognized objects with the one of the one or more of the recognized faces.

11. The system of claim 5, wherein the system is further configured to:
a. capture a third plurality of images at a second area of interest between a third start time and a third stop time;
b. after capturing each one of the third plurality of images, analyze each one of the third plurality of images using the first detection method to detect the presence of the one or more objects;
c. after capturing each one of the third plurality of images, analyze each one of the third plurality of images using the second detection method to detect a presence of the one or more faces near the one or more objects;
d. in response to detecting the presence of the one or more objects, analyze each one of the third plurality of images using the third detection method to recognize each one of the one or more objects;
e. in response to detecting the presence of the one or more faces near the one or more objects, analyze each one of the third plurality of images using the fourth detection method to recognize each one of the one or more faces; and
f. store in the memory information about each one of the one or more recognized faces and objects and a particular time when the respective one or more recognized faces and recognized objects were captured in the third plurality of image.

12. The system of claim 11, wherein the system is further configured to:
a. analyze each one of the third plurality of images to determine that one or more of the recognized objects is no longer associated with the one of the one or more of the recognized faces; and
b. store in memory information that indicates that the one or more of the recognized objects is no longer associated with the one of the one or more of the recognized faces.

13. The system of claim 5, wherein the first detection method, the second detection method, the third detection method and the fourth detection method are the same detection methods.

14. The system of claim 4, wherein the machine readable indicia includes at least one of a barcode, a QR code, and a specific marking.

15. The system of claim 1, wherein each of the one or more objects further comprise a low power identifier to help identify each of the one or more objects, wherein the low power identifier is chosen from a group consisting of a RFID tag and a Bluetooth transmitter.

16. A system for detecting an event in a classroom, the system comprising an image capture device comprising one or more cameras, at least one processor operatively coupled to the one or more cameras and memory operatively coupled to the at least one processor, wherein the at least one processor is configured to:
a. capture a first plurality of images at in the classroom between a first start time and a first stop time;
b. after capturing each one of the first plurality of images, analyze each one of the first plurality of images to detect a presence of one or more objects;
c. after capturing each one of the first plurality of images, analyze each one of the first plurality of images to detect a presence of one or more faces near the one or more objects;
d. in response to detecting the presence of the one or more objects, analyze each one of the first plurality of images to recognize each one of the one or more objects;
e. in response to detecting the presence of the one or more faces near the one or more objects, analyze each one of the first plurality of images to recognize each one of the one or more faces; and
f. store in the memory information about each one of the one or more recognized faces and objects and a particular time when the respective one or more recognized faces and objects were captured.

17. The system of claim 16, wherein the at least one processor is further configured to flag a face for later review if the face is not recognizable.

18. The system of claim 16, wherein the at least one processor is further configured to flag an object for later review if the object is not recognizable.

19. A system for detecting and tracking one or more objects, the system comprising:
a. an image capture device comprising one or more cameras, at least one processor operatively coupled to the one or more cameras and memory operatively coupled to the at least one processor; and
b. a server having at least one processor and memory, wherein the server is operatively coupled to the image capture device,
   i. wherein the image capture device is configured to:
      a) capture a first image at a particular time;

b) at least partially in response to capturing the first image, perform identification analysis of the first image to detect and identify at least one object of interest;
c) in response to detecting and identifying the at least one object of interest, storing information associated with the first image and the particular time in the image capture device memory; and
d) transmit at least a portion of the first image to the server; and
ii. wherein the server is configured to:
a) receive the at least one portion of the first image;
b) perform identification analysis of the first image to detect and confirm the identity of the at least one object of interest; and
c) in response to detecting and identifying the at least one object of interest, storing information associated with the first image and the particular time in the server memory.

20. The system of claim 19, wherein the identification analysis further comprises:
a. detecting the presence of a low power identifier associated with at least one of the one or more objects;
b. reading, by a reader, the low power identifier associated with the at least one of the one or more objects;
c. using information received from the low power identifier to confirm the identity of the one or more objects based on the reading of the low power identifier associated with the at least one of the one or more objects.

* * * * *